United States Patent [19]
Eichfeld

[11] Patent Number: 5,446,438
[45] Date of Patent: Aug. 29, 1995

[54] DIGITAL LOGIC CIRCUIT FOR IMPLEMENTING FUZZY LOGIC OPERATORS

[75] Inventor: Herbert Eichfeld, Munich, Germany

[73] Assignee: Siemens Aktiengesellschaft, Munich, Germany

[21] Appl. No.: 211,017
[22] PCT Filed: Jun. 30, 1992
[86] PCT No.: PCT/DE92/00542
  § 371 Date: Mar. 16, 1994
  § 102(e) Date: Mar. 16, 1994
[87] PCT Pub. No.: WO93/05470
  PCT Pub. Date: Mar. 18, 1993

[30] Foreign Application Priority Data
  Sep. 4, 1991 [DE] Germany .......... 41 29 423.8

[51] Int. Cl.⁶ .................................................. G06F 7/02
[52] U.S. Cl. ................................. 340/146.2; 395/900
[58] Field of Search .................. 340/146.2; 395/900

[56] References Cited
U.S. PATENT DOCUMENTS
4,414,676 11/1983 Kraul et al. .............. 340/146.2
4,760,374 7/1988 Moller ...................... 340/146.2
4,857,882 8/1989 Wagner et al. ............ 340/146.2

OTHER PUBLICATIONS
"Quelques applications des Additionneurs T.T.L." Electronique Industrielle No. 124, Jun. 1969 pp. 415–422 by Krausener.
"Comparison Look-Ahead and Design of Fast Fuzzy Operation Units", Han et al., Proceedings 20th Int. Symposium on Multiple-Valued Logic, (1990) pp. 121–125.
"Register performs binary search", Vandiver, EDN Electrical Design News, vol. 34, No. 13, Jun. 22, 1989, pp. 232–234.
"A VLSI Fuzzy Logic Controller with Reconfigurable, Cascadable Architecture", H. Watanabe et al., IEEE Journal of Solid-State Circuits, vol. 25, No. 2, Apr. 1990, pp. 376–382.

Primary Examiner—John S. Heyman
Attorney, Agent, or Firm—Hill, Steadman & Simpson

[57] ABSTRACT

The invention relates to a multi-stage digital logic circuit in which, for example, it is possible to assign an output word (C0, ..., C3) a minimum of two input words (A0, ..., A3; B0, ..., B3), and in which it is possible to form output bits (for example C3) having a high place value before output bits (for example C2, C1 or C0) having a lower place value.

15 Claims, 4 Drawing Sheets

DIGITAL LOGIC CIRCUIT FOR IMPLEMENTING FUZZY LOGIC OPERATORS

BACKGROUND OF THE INVENTION

The invention relates to a logic circuit in which an output word can be formed from first and second input words using bit comparators and bit multiplexers.

A digital logic circuit of this type is disclosed in the publication entitled "A VLSI Fuzzy Logic Controller With Reconfigurable, Cascadable Architecture" by H. Watanabe et al from IEEE Journal of Solid-State Circuits, Volume 25, No. 2, April 1990 (pages 376 to 382). This concerns relatively detailed information on the design of a fuzzy logic controller, information being contained, inter alia, on circuitry for implementing fuzzy logic operators (minimum and maximum). The digital logic circuits (minimum and maximum functions) are relatively simply designed and have a multi-stage serial structure which, starting with the LSBs (least significant bits) of the input words and ending with the MSBs (most significant bits) of the input words do not enable valid bits of an output word until the MSB of the output word is present.

The Proceedings of the Twentieth International Symposium on Multiple-valued Logic, 23.-25. May 1990, Charlotte, N.C., USA, pages 122 to 125 discloses a maximum circuit of a quick fuzzy logic processing unit which comprises cascaded blocks having bit comparators and bit multiplexers, it being possible, starting with the MSB of the input words to carry a less-than carry signal and an equal-to carry signal from stage to stage as far as the LSB.

EDN Electrical Design News, Volume 34, No. 13, 22 June 1989, pages 232 to 234, VANDIVER: "Register performs binary search" discloses a comparator which comprises comparator blocks which are connected via lines for a less-than carry signal, an equal-to carry signal and a greater-than carry signal, the inputs for the carry signals for the block which contains the LSB being permanently prescribed, and it being possible for the carry signals to be carried from stage to stage as far as the block with the MSB.

Summary of the Invention

The object of the invention is to specify a digital logic circuit in which processing starts with the combination of the MSBs of the two input words and further bits of the output word can be generated with falling significance sequentially in time, and in which the design can be as simple as possible.

The object is achieved according to the invention by a digital logic circuit, in which an output word can be formed from a first input word and a second input word using bit comparators and bit multiplexers. The output word is present at an output of the logic circuit and at outputs of the bit multiplexers. The output word represents a minimum of two input words, in which a stage is provided for each bit of the output word. Each i-th stage forms from an i-th bit of the first input word, an i-th bit of the second input word, a less-than input signal of a next more significant $(i+1)$-th stage, a greater-than input signal of the next more significant $(i+1)$-th stage and an equal-to input signal of the next more significant $(i+1)$-th stage a less-than output signal for a next less significant $(i-1)$-th stage, a greater-than output signal for the next less significant $(i-1)$-th stage, an equal-to output signal for the next less significant $(i-1)$-th stage and an i-th bit of the output word. For the most significant stage an input for the less-than input signal and an input for the greater-than input signal are supplied with a logic zero and an input for the equal-to input signal is provided with a logic one. The bits of the output word can be generated sequentially in time at the output of the logic circuit with decreasing significance.

In a modification of the present invention the most significant stage and/or a least significant stage are designed such that it is possible in the most significant stage to form only from a most significant bit of the first input word and a most significant bit of the second input word a less-than output signal, a greater-than output signal and an equal-to output signal for a next less significant stage and a most significant bit of the output word. It is possible in the least significant stage to form from a least significant bit of the first input word, from a least significant bit of the second input word, from a smaller-than input signal, from a greater-than input signal, and from an equal-to input signal of the least significant stage only a least significant output bit of the output word.

In an advantageous development of the present invention it is possible to form the less-than output signal of an i-th stage from an OR operation of the less-than input signal of the i-th stage with an AND operation of the equal-to input signal of the i-th stage, of the negated i-th bit of the first input word and of the i-th bit of the second input word. It is possible to form the greater-than output signal of the i-th stage from an OR operation of the greater-than input signal of the i-th stage with an AND operation of the equal-to input signal of the i-th stage, the i-th bit of the first input word and of the negated i-th bit of the second input word. It is possible to form the equal-to output signal of the i-th stage from an AND operation of the equal-to input signal with an equivalence operation of the two i-th bits of the first and second input words. It is possible to generate in an i-th bit multiplexer an output signal which comprises an OR operation of a first, second and third AND operation, it being possible to combine the i-th bit of the first input word with a less-than input signal of the i-th stage by means of the first AND operation, to combine the i-th bit of the second input word with the greater-than input signal by means of the second AND operation, and to combine the i-th bit both of the first and of the second input word with the equal-to input signal by means of the third AND operation.

In a modification of this development of the present invention, instead of the minimum the output word represents a maximum of the two input words. Negated i-th bits of the first and second input words take the place of the i-th bit of the first and second input words. It is possible to generate a negated i-th bit of the output word instead of the i-th bit of the output word.

In an alternative embodiment of the present invention an even-numbered stage is provided for each even-numbered bit of the output word and an odd-numbered stage is provided for each odd-numbered bit of the output word. An odd-numbered stage differs in design from an even-numbered stage. It is possible in each i-th stage to form from an i-th bit of the first input word, an i-th bit of the second input word, a first reference input signal of a next more significant $(i+1)$-th stage and a second reference input signal of a next more significant $(i+1)$-th stage, a first equal-to output signal for a next less significant $(i-1)$-th stage, a second equal-to output signal for the next less significant (i−1)-th stage and an i-th bit of the output word. For a most significant stage an input for the first reference input signal is supplied with a logic one and an input for the second reference input signal is supplied with a logic zero insofar as an odd-numbered stage is concerned. An input for the first reference input signal is supplied with a logic zero and an input for the second reference input signal is supplied with a logic one, insofar as an even-numbered stage is concerned. The bits of the output word can be generated sequentially in time at the output of the logic circuit with decreasing significance.

In a modification of this alternative embodiment the most significant stage and/or a least significant stage are designed such that it is possible in the most significant stage to form only from a most significant bit of the first input word and a most significant bit of the second input word a first reference output signal, a second reference output signal, and a most significant bit of the output word. It is possible in the least significant stage to form from a least significant bit of the first input word and from a least significant bit of the second input word, from a first reference input signal and from a second reference input signal of the least significant stage only a least significant output bit of the output word.

In an advantageous development of the preferred embodiment in the case of an odd-numbered i-th stage it is possible to form the first reference output signal of the odd-numbered i-th stage from a negated AND operation of the first reference input signal of the i-th stage with an equivalence operation of the i-th bit of the two input words. In the case of the odd-numbered i-th stage it is possible to form the second reference output signal of the i-th stage from a negated OR operation of the second reference input signal with an AND operation from the i-th bit of the second input word, the negated i-th bit of the first input word and the first reference output signal. In the case of the odd-numbered i-th stage it is possible to connect an i-th bit of the first input word to an output of the bit multiplexer of the i-th stage and to form an i-th bit of the output word, if the second reference output signal of the i-th stage assumes the value logic zero, and to connect an i-th bit of the second input word to an output of the bit multiplexer and to form an i-th bit of the output word, if the second reference output signal of the i-th stage assumes the value logic one. In the case of an even-numbered i-th stage it is possible to form the first reference output signal of the even-numbered i-th stage from an AND operation of the first reference input signal with an equivalence operation of the i-th bit of the two input words. In the case of the even-numbered i-th stage it is possible to form the second reference output signal from an OR operation of the second reference input signal with an AND operation from the negated i-th bit of the first input word, the i-th bit of the second input word and the first reference input signal. In the case of the even-numbered i-th stage it is possible with the aid of the bit multiplexer of the even-numbered i-th stage to connect an i-th bit of the first input word to an output of the bit multiplexer of the i-th stage, if the second reference output signal of the even-numbered i-th stage assumes the value logic one, and to connect an i-th bit of the second input word to an output of the bit multiplexer, if the second reference output signal of the i-th stage assumes the value logic zero.

In a modification of this development of the present invention, instead of a minimum the output word represents a maximum of the two input words. In the case of the bit multiplexer of an i-th stage the i-th bit of the first input word is interchanged with the i-th bit of the second input word.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in the several Figures of which like reference numerals identify like elements, and in which:

DESCRIPTION OF THE PREFERRED EMBODIMENT

Figure 1:
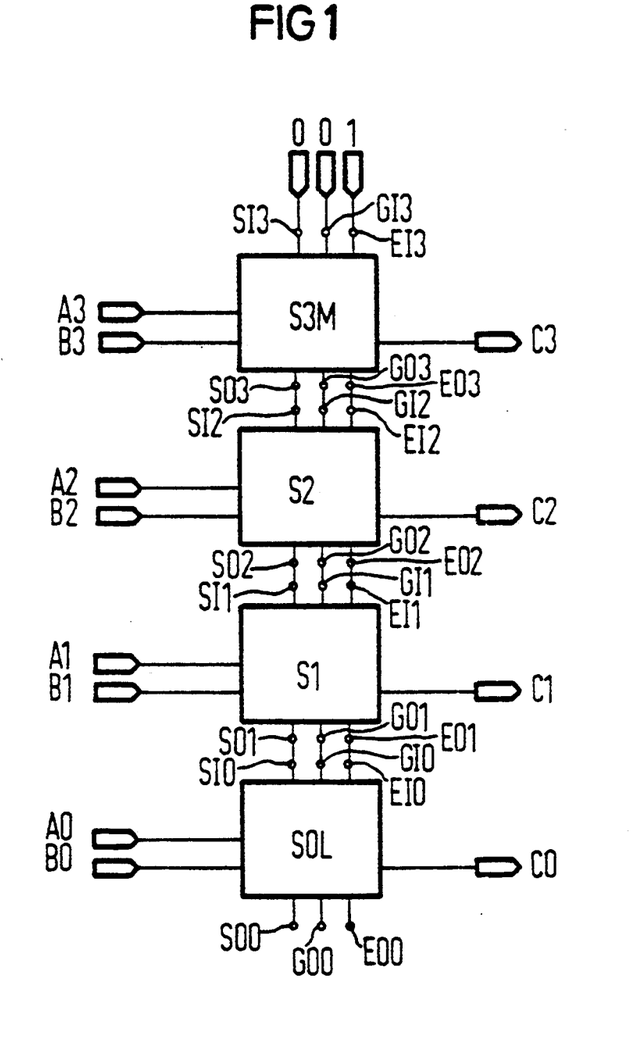
FIG. 1 shows a block diagram of a digital logic circuit according to the invention having four stages and three transmission lines.

FIG. 1 shows a block diagram of a digital logic circuit according to the invention for implementing fuzzy logic operators, which comprises four stages SOL, ... , S3M, which are connected in series with the aid of three transmission lines starting with a most-significant stage S3M, for the MSB. Each stage generally has two inputs for the respective bits $A0, \ldots, A3$ and $B0, \ldots, B3$ of the input words, three carry inputs for a less-than reference signal, a greater-than reference signal and an equal-to reference signal, three carry outputs for a less-than output signal, a greater-than output signal and an equal-to output signal, and one output for the respective bit of the output word.

A less-than output signal SO3, a greater-than output signal GO3, an equal-to output signal EO3 and the most significant bit C3 of the output word are formed in the most significant stage S3M on the two most significant bits A3 and B3, the less-than input signal SI3, the greater-than input signal GI3 and the equal-to input signal EI3. The most significant bit of the output word is thus already fixed at this instant. By means of the series circuit of the stages S3M ... SOL, the less-than output signal SO3 becomes a less-than input signal SI2 of a next less significant stage S2, the greater-than output signal GO3 becomes the greater-than input signal GI2 of the next less significant stage S2, and the equal-to output signal EO3 becomes the equal-to input signal EI2 of the next less significant stage S2. A less-than output signal SO2, a greater-than output signal GO2, an equal-to output signal EO2 and the next less significant bit C2 of the output word are now generated in the next less significant stage S2 from the next less significant bits A2 and B2, the less-than input signal SI2, the greater-than input signal GI2 and the equal-to input signal EI2. In a corresponding way the less-than output signal SO2 now becomes the less-than input signal SI1 of the stage S1, the greater-than output signal GO2 becomes the greater-than input signal GI1 of the stage S1, and the equal-to output signal E2 becomes the equal-to input signal E1 of the stage S1. In addition to the bit C1 of the output word which is next less significant in relation to the output bit C2, a less-than output signal SO1, a greater-than output signal GO1 and an equal-to output signal GO1 are generated in the stage S1 from the bits A1 and B1 of the two input words which are next less significant in relation to the bits A2 and B2, the less-than input signal SI1, the greater-than input signal GI1 and the equal-to input signal EI1. The less-than output signal SO1 becomes the less-than input signal SI0 of the least significant stage S0L, the greater-than output signal GO1 becomes the greater-than input signal GI0 of the least significant stage S0L, and the equal-to output signal EO1 becomes the equal-to input signal EI0 of the least significant stage S0. The least significant bit C0 of the output word is formed in the least significant stage S0L from the least significant bits A0 and B0 of the two input words, the less-than input signal SI0, the greater-than input signal GI0 and the equal-to input signal EI0. There is no need for a less-than output signal SO0, a greater-than output signal GO0 and an equal-to output signal EO0 of the least significant stage S0L, since no next less significant stage exists, whereas the signals SO0, GO0 and EO0 are generated if no simplified stage is used for the least significant stage S0L. Since the most significant stage S3M has no precursor stage, the less-than input signal SI3 and the greater-than input signal GI3 are permanently supplied with logic zero and the equal-to input signal EI3 is permanently supplied with logic one.

Figure 2:
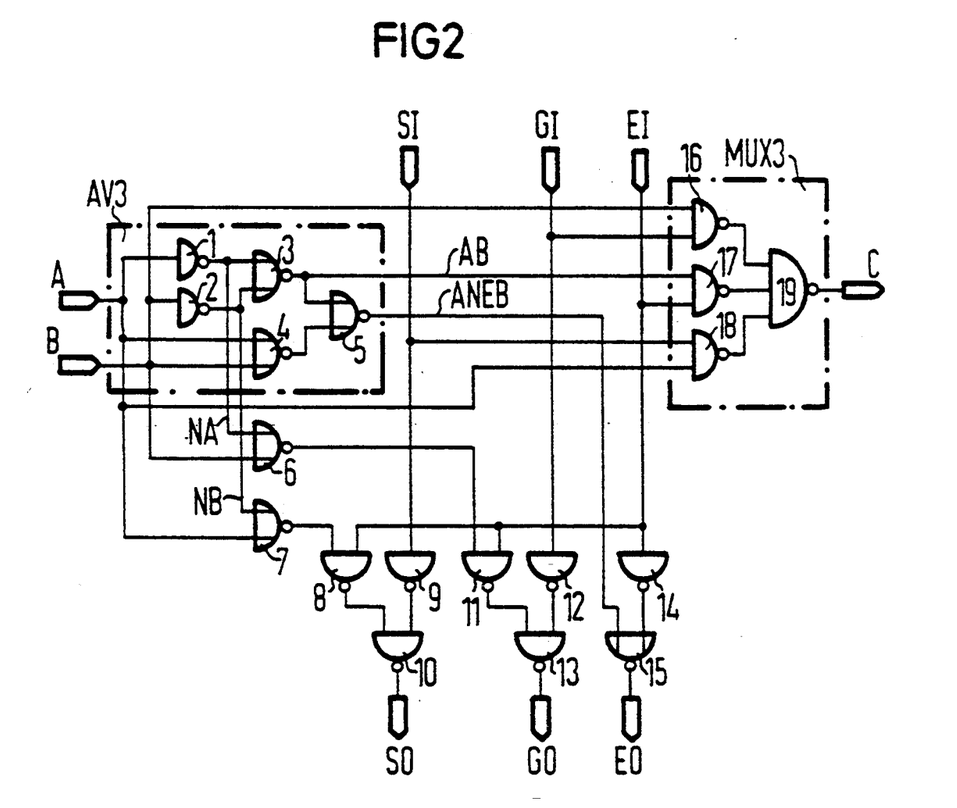
FIG. 2 shows a circuit diagram of a stage of the digital logic circuit according to FIG. 1.

The circuit diagram of a stage of the digital logic circuit for implementing fuzzy logic operators in accordance with FIG. 1 is represented in FIG. 2. Each stage generally comprises an exclusive-OR circuit AV3, a bit multiplexer MUX3 and a circuit section for forming a less-than output signal SO, a greater-than output signal GO and an equal-to output signal EO. The entire circuit stage is designed using NAND/NOR technology, since this permits a simple implementation in terms of circuitry. A bit A of the first input word is inverted in the exclusive-OR circuit AV3 by an invertor 1 and an inverted input bit NA being formed, and in a corresponding way a bit B of the second input word is inverted by an invertor 2, and inverted input bit NB being formed. An And signal AB is generated from the two inverted input bits NA and NB with the aid of a NOR gate 3. In addition, in the exclusive-OR circuit AV3 the bit A of the first input word is combined with the Bit B of the second input word by a NOR gate 4 and an output signal of the NOR gate 3 is combined with an output signal of the NOR gate 4 by a NOR gate 5 to form an exclusive-OR signal ANEB. The bit multiplexer MUX3 comprises three NAND gates 16, 17 and 18 whose outputs are combined by a three-fold NAND 19 to form a multiplexer output which simultaneously represents the output of the respective stage. The bit A is combined with a less-than input signal SI by the NAND gate 18, the bit B is combined with a greater-than input signal GI by the NAND gate 16, and the signal AB generated in the exclusive-OR circuit AV3 is combined with an equal-to input signal EI by the NAND gate 17. A stage which comprises only the exclusive-OR logic circuit AV3 and the bit multiplexer MUX2 represents to a certain extent a simplified stage which is suitable as the least significant stage S0L, since there is no need here for the less-than output signal SO, the greater-than output signal GO and the equal-to output signal EO.

There is an additional need, however, in a general stage for an additional three NOR gates 6, 7 and 15, three invertors 9, 12 and 14 and four NAND gates 8, 10, 11 and 13. The less-than output signal SO is formed in this case such that the less-than input signal SI is fed via the invertor 9 to a first input of the NAND gate 10, whose second input is connected to the output of the NAND gate 8 and at whose output the less-than output signal is available. One input of the NAND gate 8 is supplied with the equal-to input signal EI, and a second input is connected to an output of the NOR gate 7 which, for its part, receives the bit A at one input, and the signal NB, formed by the invertor 2, at a further input. As in the case of the less-than output signal, in the case of the greater-than output signal GO the greater-than input signal GI is fed to a first input of the NAND gate 13 via the invertor 12, and an output signal of the NAND gate 11 is fed to a second input of the NAND gate 13, the output of the NAND gate 13 carrying the greater-than output signal. The input of the NAND gate 11 is connected to the equal-to input signal EI, and a further input is connected to the output of the NOR gate 6 which, for its part, carries the signal NA formed by the invertor 1, at one input, and the bit B at a second input. The equal-to output signal EO is present at the output of the NOR gate 15, whose first input receives the less-than input signal EI via the invertor 14 and the exclusive-OR output signal ANEB of the exclusive-OR circuit AV3 via a further input. Due to the permanently set logic values for the less-than input signal, the greater-than input signal and the equal-to input signal, in the case of the stage S3M for the most significant bit the result is a possibility of a simplified most significant stage to the effect that the NAND gates 16 and 18 of the multiplexer MUX3 can be omitted, consequently simplifying the three-fold NAND 19 to an invertor, and that the invertors 9, 12 and 14 can be omitted, consequently simplifying the NAND gates 10 and 13 and the NOR gate 15 to invertors.

The logic functions of this stage are as follows:

$SO:=SI+EI*AB$ $GO:=GI+EI*AB$ $EO:=EI*(A'B)$ $C:=A*SI+B*GI+A*B*EI$

A circuit arrangement for a minimum function is set forth by way of example in FIG. 2. A maximum function can easily be obtained by respectively additionally inverting the bits A and B at the input and the bit C at the output.

Since the carry from stage to stage can assume three states (less than, greater than and equal to), two bits and two transmission lines already suffice.

Figure 3:
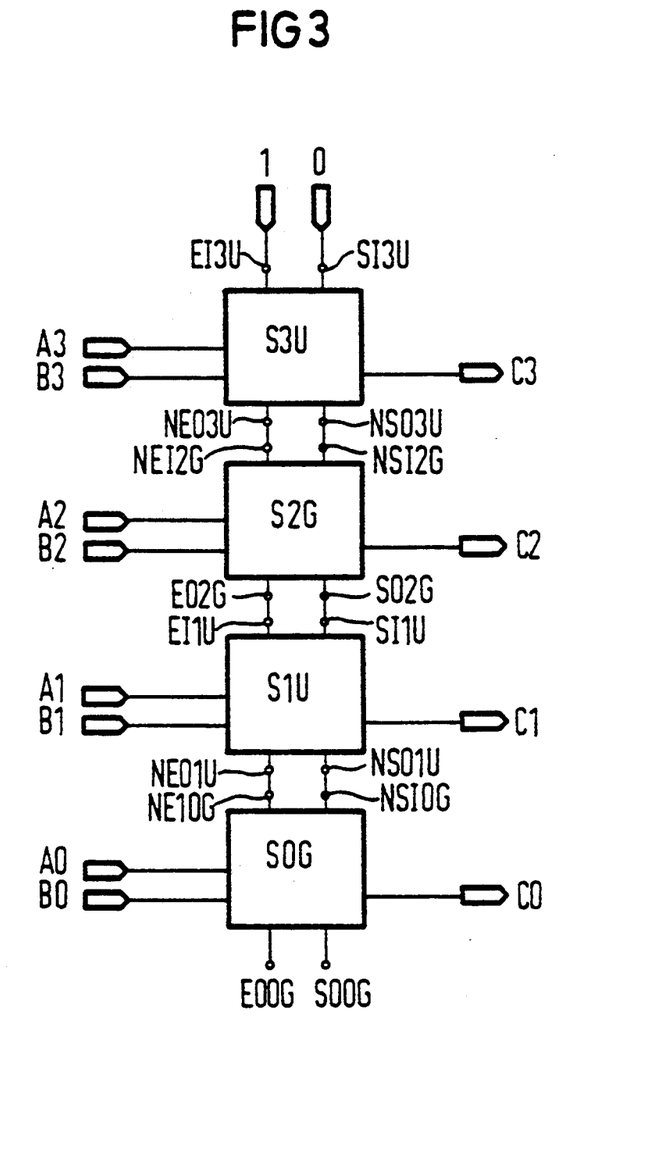
FIG. 3 shows a block diagram of a digital logic circuit according to the invention having four stages and two transmission lines.

A digital logic circuit according to the invention for implementing fuzzy logic operators having four stages S0G, S1U, S2G and S3U and having two transmission lines is represented in FIG. 3. Since these stages are also implemented using NAND/NOR technology, even-numbered stages S0G and S2G are designed differently from odd-numbered stages S1O and S3O, in order to save invertors and processing time.

A first reference output signal NEO3U, a second reference output signal NSO3U and the most significant bit C3 of the output word are generated in the most significant stage S3U from a most significant bit A3 of the first input word, a most significant bit B3 of the second input word, a first reference input signal EI3U and a second reference input signal SI3U. In this case, one input for the first reference input signal EI3U is permanently occupied by logic one and one input for the second reference input signal SI3U is permanently occupied by logic zero, if the most significant stage is odd-numbered and the input for the first reference input signal is permanently occupied by logic zero and the input for the second reference input signal is permanently occupied by logic one, if the most significant stage represents an even-numbered stage. The first reference output signal NEO3U becomes the reference input signal NEI2G, and the second reference output signal NSO3U becomes the second reference input signal NSI2G of the next less significant even-numbered stage S2G. In addition to a next less significant bit C2 of the output word, a first reference output signal EO2G and a second reference output signal SO2G are generated in the stage S2G from the next less significant bits A2 and B2 of the two input words, the first reference input signal NEI2G and the second reference input signal NSI2G. The first reference output signal EO2G now becomes a first reference input signal EI1U, and the second reference output signal SO2G becomes a reference input signal SI1U of a stage S1U which is next less significant with reference to the stage S2G. A reference output signal NEO1U, a second reference output signal NSO1U and a bit C1 of the output word which is next less significant with reference to the bit C2 are generated in the stage S1U from the bits A1 and B1 of the two input words which are next less significant with reference to the bits A2 and B2, the first reference input signal EI1U and the second reference input signal SI1U. The first reference output signal NEO1U becomes a first reference input signal NEI0G, and the second reference output signal NSO1U becomes a second reference input signal NSI0G of a least significant stage S0G. In addition to a least significant bit C0 of the output word, in the general case a first reference output signal EO0G and a second reference output signal SO0G are generated in the least significant stage S0G from the least significant bits A0 and B0 of the two input words, the first reference input signal NEI0G and the second reference input signal NSI0G, the generation of the first reference output signal EO0G and SO0G being superfluous in the case of the least significant stage S0G and it be possible for the stage to be correspondingly simplified.

Figure 4:
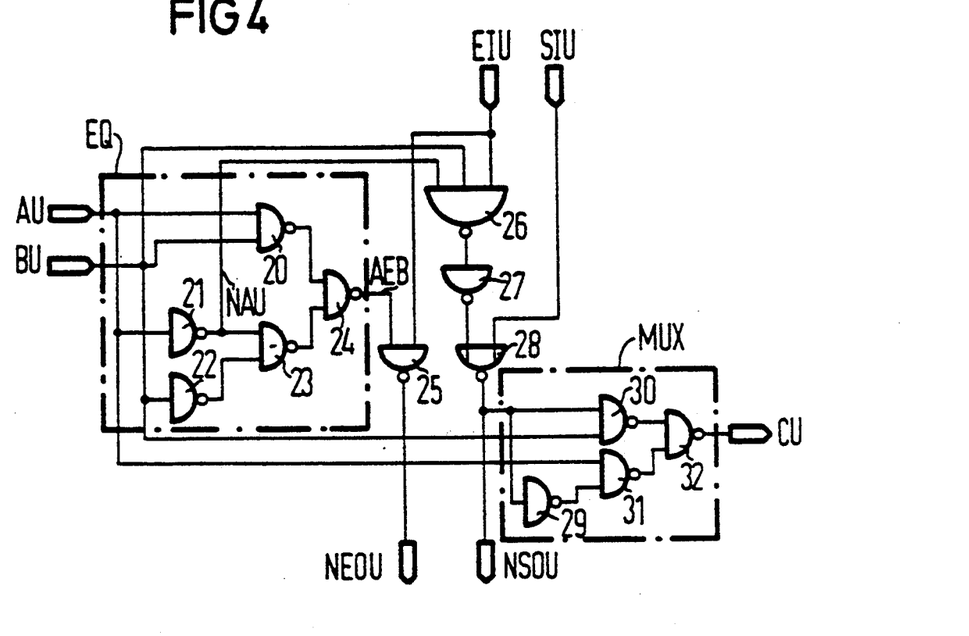
FIG. 4 shows a circuit diagram of an odd-numbered stage of the digital logic circuit according to FIG. 3.

The circuit diagram of an odd-numbered stage of a digital logic circuit according to the invention and in accordance with FIG. 3 is represented in FIG. 4. The circuit is, once again, designed using NAND/NOR technology and contains an equivalence operation EQ and a bit multiplexer MUX, whose output supplies the respective bit CU of the output word. The equivalence circuit EQ comprises invertors 21 and 22 and the NAND gates 20, 23 and 24, and supplies an equivalence signal AEB. The bit multiplexer MUX comprises an inverter 29 and the NAND gates 30, 31 and 32. The equivalence signal AEB is formed by combining in the NAND gate 24 the odd-numbered bits AU and BU of the two input words combined by the NAND gate 20 and the inverted odd-numbered bits AU and BU of the two input words combined by the NAND gate 23, the inverting of the bit AU being performed by the invertor 21 to form a signal NAU, and the inverting of the bit BU being performed via the invertor 22. A first reference output signal NE0U is formed from a first reference input signal EIU and the equivalence signal AEB via a NAND gate 25. The first reference input signal EIU is combined in a three-fold NAND 26 with the bit BU and the signal NAU from the equivalence circuit EQ, subsequently inverted by an invertor 27, and combined with a second reference input signal SIU to form a second reference output signal NS0U with the aid of a NOR gate 28. The second reference output signal NS0U serves as control signal for the bit multiplexer MUX and is fed directly to an input of a NAND gate 30 and, via an invertor 29, to an input of a NAND gate 31. The NAND gate 30 has a second input, which is supplied with the bit BU and the NAND gate 31 has a second input, which is supplied with the bit AU, and the two outputs of the NAND gates 30 and 31 are combined to form the multiplexer output signal by a NAND gate 32.

The logic functions of this stage are as follows:

$$NEOU := EOU := (AU \equiv BU) * EIU$$

$$NSOU := SOU := AU * BU * EIU + SIU$$

$$CU := A*SOU + B*SOU$$

Figure 5:
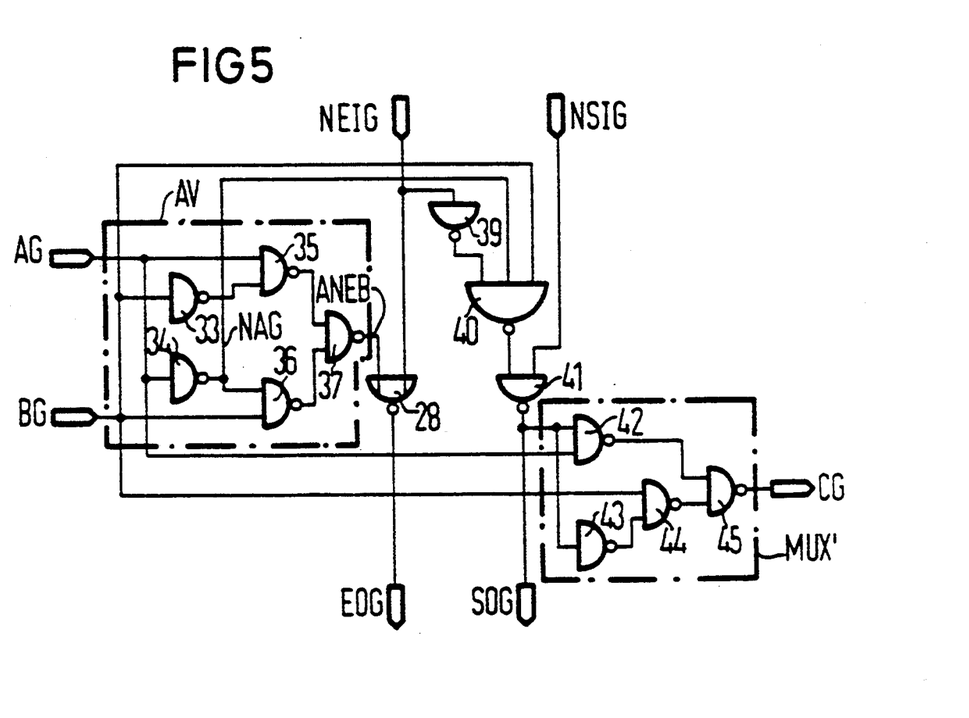
FIG. 5 shows a circuit diagram of an odd-numbered stage of the digital logic circuit according to FIG. 3.

The circuit diagram represented in FIG. 5 of an even-numbered stage of a digital logic circuit according to the invention for implementing fuzzy logic operators in accordance with FIG. 3 shows a structure similar to that of the odd-numbered stage represented in FIG. 4. Instead of the equivalence gates, use is made of an exclusive-OR gate AV, and a bit multiplexer MUX' corresponds in design to the bit multiplexer MUX of FIG. 4. An exclusive-OR output signal ANEB of the exclusive-OR circuit AV is generated by combining an output signal of a NAND gate 35 with an output signal of a NAND gate 36 with the aid of a NAND gate 37, combining the input signals of the NAND gate 35 by an even-numbered bit AG of the first input word and an even-numbered bit BG, inverted by an invertor 33, of a second input word, and by using the NAND gate 36 to combine the even-numbered bit BG of the second input word with the even-numbered bit of the first input word which is inverted by an invertor 34 to form a signal NAG. A first reference input signal NEIG is combined with an equivalence output signal ANEB to form a first reference output signal EOG by means of a NOR gate 38. In addition, the first reference input signal NEIG is fed via an invertor 39 to an input of a three-fold NAND 40 and combined with the signal NAG from the exclusive-OR circuit AV and with the even-numbered bit BG, and the output signal of the NAND circuit 40 is combined in a NAND circuit 41 to a second reference input signal NSIG to form a second reference output signal S0G. The second reference output signal S0G serves to drive the multiplexer MUX' and is led directly to an input of a NAND gate 42 and via an invertor 43 to a NAND gate 44, the outputs of the NAND gates 42 and 44 being combined by a NAND gate 45 and forming an output of the multiplexer MUX'. A second input of the NAND gate 42 is supplied in this case with the bit AG, and a second input of the NAND gate 44 is supplied with the bit BG.

The logic functions of this stage are as follows:

$$EOG := (AG \equiv BG) * NEIG \text{ where } NEIG := EIG$$

$$SOG := AGBG*NEIG + NSIG \text{ where } NSIG := SIG$$

$$CG := A*SOG + B*\overline{SOG}$$

The least significant stage can be simplified to the effect that of the exclusive-OR circuit AV only the invertor 34 for generating the signal NAG remains and the NOR gate 38 is saved, since in the case of the least significant stage there is no need to generate the first reference output signal EOG. In the case of a most significant stage, this stage can be simplified by replacing the NOR gate 38 by an invertor and the NAND gate 41 by an invertor. In addition, an equivalence circuit can take the place of the exclusive-OR circuit AV having a downstream invertor.

The stages in FIGS. 4 and 5 refer to a minimum function, in which the smaller of the two input words of a first and a second input word reaches the output. All that is required to generate a maximum function is to interchange the bits AU and BU in the multiplexer MUX and the bits AG and BG in the multiplexer MUX'. The digital logic circuits shown are designed for a word length of four bits, whereas the circuit is suitable for arbitrary word length.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A digital logic circuit, in which an output word having a plurality of bits is formed from a first input word having a plurality of bits and a second input word having a plurality of bits by means of bit comparators and bit multiplexers the output word being present at an output of the logic circuit and at outputs of the bit multiplexers, and in which the output word represents a minimum of two input words, comprising: a plurality of i stages where i is a whole number, a respective stage thereof providing a respective bit of the output word; an i-th stage of the plurality of i stages forming from an i-th bit of the first input word, from an i-th bit of the second input word, from a less-than input signal of a next more significant (i+1)-th stage from a greater-than input signal of the next more significant (i+1)-th stage and from an equal-to input signal of the next more significant (i+1)-th stage a less-than output signal for a next less significant (i−1)-th stage a greater-than output signal for the next less significant (i−1)-th stage, an equal-to output signal for the next less significant (i−1)-th stage and an i-th bit of the output word; a most significant stage of the plurality of i stages having an input for a respective less-than input signal supplied with a logic zero and an input for a respective greater-than input signal supplied with a logic zero and an input for a respective equal-to input signal supplied with a logic one, the bits of the output word being generated sequentially in time at the output of the logic circuit with decreasing significance.

2. The digital logic circuit as claimed in claim 1, wherein the most significant stage has means for forming only from a most significant bit of the first input word and a most significant bit of the second input word a less-than output signal, a greater-than output signal and an equal-to output signal for a next less significant stage and a most significant bit of the output word.

3. The digital logic circuit as claimed in claim 1, wherein the less-than output signal of an i-th stage is formed from an OR operation of the less-than input signal of the i-th stage with an AND operation of the equal-to input signal of the i-th stage, of the negated i-th bit of a first input word and of the i-th bit of the second input word, wherein the greater-than output signal of the i-th stage is formed from an OR operation of the greater-than input signal of the i-th stage with an AND operation of the equal-to input signal of the i-th stage, the i-th bit of the first input word and of a negated i-th bit of the second input word, wherein the equal-to output signal of the i-th stage is formed from an AND operation of the equal-to input signal with an equivalence operation of the two i-th bits of the first input word and second input word, and wherein in an i-th bit multiplexer an output signal is generated by an OR operation of first, second and third AND operations the i-th bit of the first input word being combined with a less-than input signal of the i-th stage by means of the first AND operation, the i-th bit of the second input word being combined with the greater-than input signal by means of the second AND operation, and the i-th bit both of the first and of the second input words being combined with the equal-to input signal by means of the third AND operation.

4. The digital logic circuit as claimed in claim 3, wherein the digital logic circuit further comprises, in the i-th stage, means for inverting the i-th bit of the first input word and the i-th bit of the second input word, and means for inverting the i-th bit of the output word, the output word thereby representing a maximum of the first and second input words instead of a minimum of the first and second input words.

5. The digital logic circuit as claimed in claim 1, wherein the least significant stage has means for forming from a least significant bit of the first input word, from a least significant bit of the second input word, from a smaller-than input signal, from a greater-than input signal, and from an equal-to input signal of the least significant stage only a least significant bit of the output word.

6. A digital logic circuit, in which an output word having a plurality of bits is formed from a first input word having a plurality of bits and a second input word having a plurality of bits by means of bit comparators and bit multiplexers, the output word being present at an output of the logic circuit and at outputs of the bit multiplexers, and in which the output word represents a minimum of two input words, comprising: a plurality of i stages where i is a whole number and having even-numbered stages and od-number stages, a respective even-numbered stage provided for a respective even-numbered bit of the output word and a respective odd-numbered stage provided for a respective odd-numbered bit of the output word, an odd-numbered stage differing in design from an even-numbered stage, an i-th stage of the plurality of i stages forming from an i-th bit of the first input word, from an i-th bit of the second input word, from a first reference input signal of a next more significant (i+1)-th stage and from a second reference input signal of a next more significant (i+1)-th stage a first equal-to output signal for a next less significant (i−1)-th stage, a second equal-to output signal for the next less significant (i−1)-th stage and an i-th bit of the output word; a most significant stage an input for a respective first reference input signal supplied with a logic one and an input for a respective second reference input signal supplied with a logic zero for an odd-numbered stage, and an input for a respective first reference input signal supplied with a logic zero and an input for a respective second reference input signal supplied with a logic one, for an even-numbered stage, and the bits of the output word being generated sequentially in time at the output of the logic circuit with decreasing significance.

7. The digital logic circuit as claimed in claim 6, wherein the most significant stage has means for forming only from a most significant bit of the first input word and a most significant bit of the second input word, a first reference output signal, a second reference output signal, and a most significant bit of the output word.

8. The digital logic circuit as claimed in claim 7, wherein for an odd-numbered i-th stage the first reference output signal of the odd-numbered i-th stage is formed from a negated AND operation of the first reference output signal of the i-th stage with an equivalence operation of the i-th bit of the first and second input words, the odd-numbered i-th stage the second reference output signal of the i-th stage is formed from a negated OR operation of the second reference input signal with an AND operation from the i-th bit of the second input word, a negated i-th bit of the first input word and the first reference output signal, wherein for the odd-numbered i-th stage an i-th bit of the first input word is connected to an output of the bit multiplexer of the i-th stage and forms an i-th bit of the output word, if the second reference output signal of the i-th stage assumes the value logic zero, and an i-th bit of the second input word is connected to the output of the bit multiplexer and forms an i-th bit of the output word, if the second reference output signal of the i-th stage assumes the value logic one, wherein for an even-numbered i-th stage the first reference output signal of the even-numbered i-th stage is formed from an AND operation of the first reference input signal with an equivalence operation of the i-th bit of the first and second input words, wherein for the even-numbered i-th stage the second reference output signal is formed from an OR operation of the second reference input signal with an AND operation from a negated i-th bit of the first input word, from the i-th bit of the second input word and from the first reference input signal, and wherein for the even-numbered i-th stage with the bit multiplexer of the even-numbered i-th stage an i-th bit of the first input word is connected to an output of the bit multiplexer of the i-th stage, if the second reference output signal of the even-numbered i-th stage assumes the value logic one, and an i-th bit of the second input word is connected to the output of the bit multiplexer, if the second reference output signal of the i-th stage assumes the value logic zero.

9. The digital logic circuit as claimed in claim 8, wherein instead of a minimum the output word represents a maximum of the first and second input words, and wherein the bit multiplexer of an i-th stage the i-th bit of the first input word is interchanged with the i-th bit of the second input word.

10. The digital logic circuit as claimed in claim 6, wherein the least significant stage has means for forming from a least significant bit of the first input word, from a least significant bit of the second input word, from a first reference input signal and from a second reference input signal of the least significant stage only a least significant bit of the output word.

11. A digital logic circuit, in which an output word having a plurality of bits is formed from a first input word having a plurality of bits and a second input word having a plurality of bits by means of bit comparators and bit multiplexers, the output word being present at an output of the logic circuit and at outputs of the bit multiplexers, and in which the output word represents a minimum of two input words, comprising:
a plurality of i stages where i is a whole number, a respective stage thereof providing a respective bit of the output word;
each of said i stages of the plurality of i stages having first and second inputs for receiving the i-th bits of the first and second input words, respectively, and having a word bit output for producing the i-th bit of the output word;
each of said i stages of the plurality of i stages also having a less-than input for receiving a respective less-than input signal;
each of said i stages of the plurality of i stages also having a greater-than input for receiving a respective greater-than input signal;
each of said i stages of the plurality of i stages also having an equal-to input for receiving a respective equal-to input signal;
each of said i stages of the plurality of i stages also having a less-than output for providing a respective less-than output signal;
each of said i stages of the plurality of i stages also having a greater-than output for providing a respective greater-than output signal;
each of said i stages of the plurality of i stages also having an equal-to output for providing a respective equal-to output signal;
an i-th stage of the plurality of i stages forming from an i-th bit of the first input word, from an i-th bit of the second input word, from a less-than input signal of a next more significant (i+1)-th stage, from a greater-than input signal of the next more significant (i+1)-th stage and from an equal-to input signal of the next more significant (i+1)-th stage a less-than output signal for a next less significant (i−1)-th stage, a greater-than output signal for the next less significant (i−1)-th stage, an equal-to output signal for the next less significant (i−1)-th stage and an i-th bit of the output word;
a most significant stage of the plurality of i stages having the less-than input thereof supplied with a logic zero and the greater-than input thereof supplied with a logic zero and the equal-to input thereof supplied with a logic one; and
means for generating bits of the output word sequentially in time at the output of the logic circuit beginning with most significant bits of the first and second input words and ending with least significant bits of the first and second input words.

12. The digital logic circuit as claimed in claim 11, wherein the most significant stage has means for forming only from a most significant bit of the first input word and a most significant bit of the second input word a less-than output signal, a greater-than output signal and an equal-to output signal for a next less significant stage and a most significant bit of the output word.

13. The digital logic circuit as claimed in claim 11, wherein the less-than output signal of an i-th stage is formed from an OR operation of the less-than input signal of the i-th stage with an AND operation of the equal-to input signal of the i-th stage, of the negated i-th bit of a first input word and of the i-th bit of the second input word, wherein the greater-than output signal of the i-th stage is formed from an OR operation of the greater-than input signal of the i-th stage with an AND operation of the equal-to input signal of the i-th stage, the i-th bit of the first input word and of a negated i-th bit of the second input word, wherein the equal-to output signal of the i-th stage is formed from an AND operation of the equal-to input signal with an equivalence operation of the two i-th bits of the first input word and second input word, and wherein in an i-th bit multiplexer an output signal is generated by an OR operation of first, second and third AND operations the i-th bit of the first input word being combined with a less-than input signal of the i-th stage by means of the first AND operation, the i-th bit of the second input word being combined with the greater-than input signal by means of the second AND operation, and the i-th bit both of the first and of the second input words being combined with the equal-to input signal by means of the third AND operation.

14. The digital logic circuit as claimed in claim 13, wherein the digital logic circuit further comprises, in the i-th stage, means for inverting the i-th bit of the first input word and the i-th bit of the second input word, and means for inverting the i-th bit of the output word, the output word thereby representing a maximum of the first and second input words instead of a minimum of the first and second input words.

15. The digital logic circuit as claimed in claim 11, wherein the least significant stage has means for forming from a least significant bit of the first input word, from a least significant bit of the second input word, from a smaller-than input signal, from a greater-than input signal, and from an equal-to input signal of the least significant stage only a least significant bit of the output word.

* * * * *